T. E. MURRAY, Jr.
ELECTRIC WELDING AND PRODUCT THEREOF.
APPLICATION FILED JAN. 10, 1918.

1,293,867.

Patented Feb. 11, 1919.

INVENTOR
Thomas E. Murray Jr.
BY
Carl Benjamin
his ATTORNEY

UNITED STATES PATENT OFFICE.

THOMAS E. MURRAY, JR., OF BROOKLYN, NEW YORK.

ELECTRIC WELDING AND PRODUCT THEREOF.

1,293,867.   Specification of Letters Patent.   Patented Feb. 11, 1919.

Original application filed October 4, 1917, Serial No. 194,684. Divided and this application filed January 10, 1918. Serial No. 211,250.

*To all whom it may concern:*

Be it known that I, THOMAS E. MURRAY, Jr., a citizen of the United States, residing at Brooklyn, in the county of Kings and State of New York, have invented a certain new and useful Improvement in Electric Welding and Products Thereof, of which the following is a specification.

The invention relates to electric welding, and consists in a product thereof, wherein the objects are united by a circumscribed area, or circumscribed areas, of condensed and compressed metal. Surrounding each spot, or intervening between said spots, may also be produced areas of metal in a less compressed or condensed state than the metal of said spots. Between said areas of less compression may be areas of non-union between said objects. I thus produce welded objects having joints which may be of great strength, which strength I may vary to suit circumstances.

This application is a division of my application Serial No. 194,684, filed October 4, 1917, now Patent No. 1,259,271, patented Mar. 12, 1918.

In the accompanying drawings—

Figure 1:
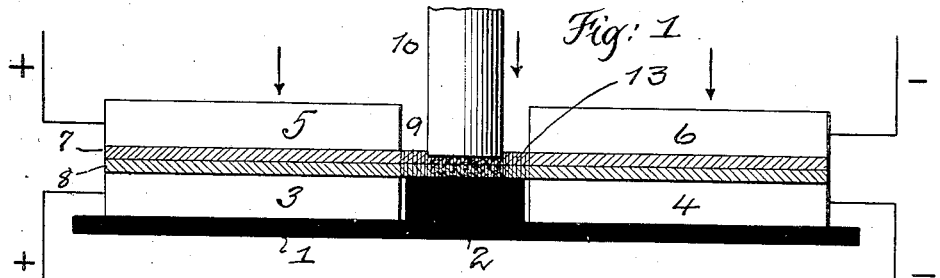
Figure 2:
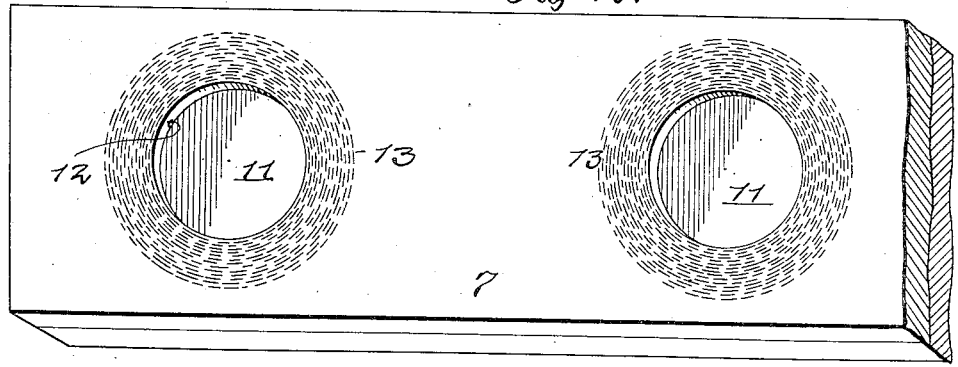
Figure 3:
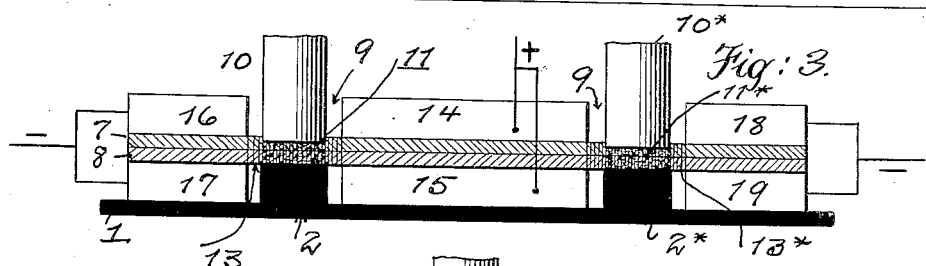
Figure 4:
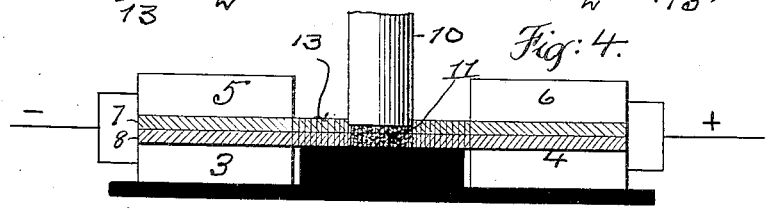
Figure 5:
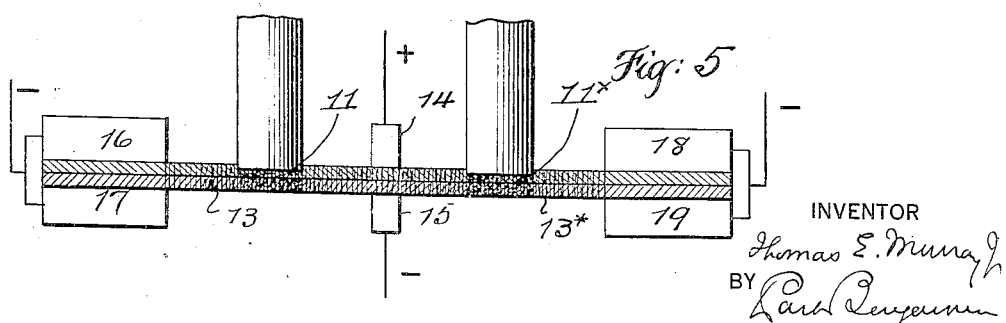

Figure 1 shows two plates in section welded together in accordance with my invention, and disposed between the welding electrodes and in the pressing device shown in elevation. Fig. 2 is a perspective view of said welded plates, showing two welds therein. Fig. 3 is a sectional view, showing the plates united by two welds as in Fig. 2. Fig. 4 is a sectional view, similar to Fig. 1, showing the space between the electrodes of much greater width than the diameter of the pressing tool, so that the welded areas of the plates are correspondingly increased. Fig. 5 is a sectional view, showing two welded areas closely approximated, so that practically there are no unwelded portions of the plates between said areas.

Similar numbers of reference indicate like parts.

Referring first to Fig. 1, 1 is a base or table of refractory insulating material, having an upward projection at 2. Upon said base and on opposite sides of said projection are placed the members 3, 4 of a pair of fixed electrodes—preferably copper blocks. Above the fixed electrodes 3, 4 are supported in any suitable manner so as to be vertically movable, a pair of similar electrodes 5, 6. The stationary objects to be welded—here metal plates—are shown at 7 and 8, and bridge the space 9 between the pair of electrodes 5, 3 and the pair of electrodes 6, 4. Directly above the space 9 is arranged a vertically movable presser tool 10, which may be of cylindrical shape.

When the welding circuit is established, so much of plate 8 as lies between electrodes 3, 4 and the like area of plate 7 lying between electrodes 5, 6 become highly heated and plastic. The presser tool 10 comes down forcibly upon the upper plate 7, thus compressing the softened or plastic metal of the two plates between the lower face of said tool and the upper face of projection 2. By reason of the forcible compression of said heated metal, the tool enters for a short distance into the upper plate 7, forming a recess 12.

As each of the plates 7, 8 to be united is electrically heated to a plastic state independently of the other plate, there is no current path from one plate to the other, but, on the contrary, the current path in one plate, as 7, from electrode 5 to electrode 6, is parallel to the current path in the opposite plate 8 from electrode 3 to electrode 4. It is also obvious that inasmuch as there is no passage of the current in a transverse direction across a joint between the meeting surfaces of the plates, the resistance of such a joint is not a factor in any wise affecting the electrical heating of said plates; and it is further obvious that even if the plates be electrically heated, a weld between them is not produced solely for that reason, but something else must be done, namely: the forcing of the plates together by the descending presser tool 10 at the place where their union is desired. Because the two plates are supported upon the unyielding projection 2, not only are the plates forced to unite over an area corresponding to the area of the bottom face of the tool 10, but the metal is compressed and condensed, as indicated by the darker shaded portion 11 in the sectional views of said plates, Figs. 1, 3, 4, 5. The extent of condensation is indicated by the reduced thickness of the two plates incident to the formation of the recess 12. It will be obvious that the metal of the plates included within the space 9 and surrounding the highly compressed portion 12 above noted is also compressed and condensed, but in a less degree than is said portion 11. This less compressed portion is indicated at 13, see dotted lines, Fig. 2. In other words, I do not produce between the plates a small sharply defined place of welding or spot isolated in position and bounded by a distinct and well defined area in which the pieces are not welded together. The area of this less compressed portion 13 is furthermore governed by the width of the space 9 which separates the electrodes, as will be evident by comparing Figs. 1 and 4. In Fig. 4, the electrodes are much more widely separated than in Fig. 1, thus presenting a much larger area of the plates to the heating effect of the current. If only the central portion of that increased area is condensed and compressed by the presser tool 10 of Fig. 4, then the area of less compression 13 will be relatively much greater than as shown in Fig. 1. So that in this way I can vary the width of that less compressed area as I may see fit, or, conversely, and by the same means, vary the areas of no weld between the plates as I may desire. Thus, for example, referring to Fig. 3, here I have shown the plates 7 and 8 acted upon by two presser tools 10, 10* opposed by two projections 2, 2* on the insulated table 1. Between the tools 10, 10* are arranged electrodes 14 and 15, both connected here to the plus terminal of the supply circuit. The electrodes 16, 17, 18, 19 are all connected to the minus terminal of the same circuit. The width of the spaces 9 between the plus and minus electrodes is the same. As a consequence, when the presser tools 10, 10* operate, two spots 11, 11* of high condensation are made, each surrounded by narrow areas 13, 13* of union of less compressed or condensed metal. The portions of the plates then which are in contact between the upper and lower electrodes are portions of no weld.

Now referring to Fig. 5, from which I have omitted for convenience the insulating table and projections, the middle electrodes 14, 15 are made very narrow, and the spaces 9, equaling one another, relatively wide. Here the spots of high compression are made, as before, but between the areas 13, 13* of less compression surrounding these highly condensed spots 11, 11* the plates are substantially united. In other words, the area of low compression 13 surrounding one highly condensed spot, as 11, Fig. 5, substantially joins the area of low compression 13* surrounding the other highly compressed spot 11*.

It will be obvious that in this way I produce what are practically two plates welded together over their entire opposing surfaces, having spots or circumscribed areas where the metal is not only united, but subjected to high compression and condensation—the result being a very much stronger product than can be obtained by uniting the plates by simply distinct isolated well defined spots separated by areas of no union.

I claim:

1. Two metal bodies united by a plurality of electrically welded spots of the metal of said bodies in a compressed state, each of said spots being surrounded by a definite united area of said metal in a less compressed state.

2. Two metal bodies united by electrical welding as in claim 1, the said surrounding areas of united and less compressed metal having between them areas wherein the two bodies are not united.

In testimony whereof I have affixed my signature in presence of two witnesses.

THOMAS E. MURRAY, Jr.

Witnesses:
GERTRUDE T. PORTER,
MAY T. McGARRY.